United States Patent [19]
Feeley et al.

[11] Patent Number: 5,792,436
[45] Date of Patent: Aug. 11, 1998

[54] METHOD FOR USING A REGENERABLE CATALYZED TRAP

[75] Inventors: Jennifer S. Feeley, Clinton; Robert J. Farrauto, Westfield; Michel Deeba, North Brunswick; Jordan K. Lampert, Metuchen, all of N.J.

[73] Assignee: Engelhard Corporation, Iselin, N.J.

[21] Appl. No.: 645,301

[22] Filed: May 13, 1996

[51] Int. Cl.[6] .................. B01D 53/56; B01D 53/75; B01D 53/86; B01D 53/94
[52] U.S. Cl. ............. 423/210; 423/213.2; 423/213.5; 423/213.7; 423/239.1; 423/244.02; 423/541.1
[58] Field of Search ............. 423/213.2, 213.5, 423/213.7, 239.1, 244.01, 244.02, 541.1, 210

[56] References Cited

U.S. PATENT DOCUMENTS

| | | | |
|---|---|---|---|
| 3,784,675 | 1/1974 | Kobylinski et al. | 423/213.5 |
| 3,801,697 | 4/1974 | Kobylinski et al. | 423/213.7 |
| 3,809,743 | 5/1974 | Unland et al. | 423/213.5 |
| 3,896,616 | 7/1975 | Keith et al. | 60/274 |
| 3,907,968 | 9/1975 | Kobylinski et al. | 423/213.5 |
| 4,105,590 | 8/1978 | Koberstein et al. | 252/464 |
| 4,188,364 | 2/1980 | Gladden | 423/213.2 |
| 4,206,087 | 6/1980 | Keith et al. | 252/462 |
| 4,261,862 | 4/1981 | Kinoshita et al. | 252/462 |
| 4,274,981 | 6/1981 | Suzuki et al. | 252/438 |
| 4,289,737 | 9/1981 | Acres et al. | 423/245 |

(List continued on next page.)

FOREIGN PATENT DOCUMENTS

| | | | |
|---|---|---|---|
| 68796 | 1/1983 | European Pat. Off. | |
| 0142859 | 5/1985 | European Pat. Off. | 423/213.5 |
| 0 439 010 A2 | 7/1991 | European Pat. Off. | 423/239.1 |
| 503882 | 9/1992 | European Pat. Off. | |
| 537942 | 4/1993 | European Pat. Off. | |
| 537968 | 4/1993 | European Pat. Off. | |

(List continued on next page.)

OTHER PUBLICATIONS

Miyoshi et al, Development of New Concept Three–Way Catalyst for Automatic Lean–Burn Engines, SAE #950809, Feb. 1995.

Hirabayashi et al, High Catalytic Activity of Platinum–ZSM–5 Zeolite Below 500 K in Water Vapor for Reduction of Nitrogen Monoxide, Chemistry Letters, 1992, pp. 2235–2236 (No Month).

Iwamoto et al, Performance and Durability of Pt MFI Zeolite Catalyst for Selective Reduction of Nitrogen Monoxide in Actual Diesel Engine Exhaust, Applied Catalysis, B. Env., 1994, pp. L1–L6 (No Month).

Takahashi et al, Environmental Catalysis 1995 SCI Publishers Rome, Italy: "The New Concept Three–Way Catalyst for Automotive Lean–Burn Engine Storage and Reduction Catalyst," May 1995, pp. 45–48; Proceedings of the 1st World Congress Pisa, Italy.

*Primary Examiner*—Gary P. Straub
*Assistant Examiner*—Timothy C. Vanoy
*Attorney, Agent, or Firm*—Theodore J. Shatynski

[57] ABSTRACT

A method of at least periodically removing from a lean gaseous stream a sorbable component such as $SO_x$ includes passing the gaseous stream through a trap member having an oxidation catalyst combined with a sorbent material at a temperature within the sorbing temperature range of the sorbent material. The sorbed component is periodically removed by introducing a combustible component into the gaseous stream and oxidizing it on the trap member to thermally desorb the sorbed component. The amount of combustible component introduced is limited to maintain the gaseous stream composition lean, but is sufficient to increase the surface temperature of at least part of the trap member to above the bulk temperature of the gaseous stream. Sorbing and desorbing periods are alternated and a composition and an apparatus to carry out the process is provided.

12 Claims, 7 Drawing Sheets

U.S. PATENT DOCUMENTS

| | | | |
|---|---|---|---|
| 4,380,510 | 4/1983 | D'Aniello, Jr. | 252/466 PT |
| 4,552,733 | 11/1985 | Thompson et al. | 423/213.5 |
| 4,742,038 | 5/1988 | Matsumoto | 502/303 |
| 4,849,398 | 7/1989 | Takada et al. | 502/303 |
| 4,880,764 | 11/1989 | Imai et al. | 502/326 |
| 4,902,664 | 2/1990 | Wan | 502/300 |
| 4,977,129 | 12/1990 | Ernest | 502/330 |
| 5,024,981 | 6/1991 | Speronello et al. | 502/67 |
| 5,041,272 | 8/1991 | Tamura et al. | 423/239 |
| 5,041,407 | 8/1991 | Williamson et al. | 502/303 |
| 5,128,306 | 7/1992 | Dettling et al. | 502/304 |
| 5,155,994 | 10/1992 | Muraki et al. | 60/275 |
| 5,202,300 | 4/1993 | Funabiki et al. | 502/304 |
| 5,260,249 | 11/1993 | Shiraishi et al. | 502/304 |
| 5,330,732 | 7/1994 | Ishibashi et al. | 423/213.2 |
| 5,376,610 | 12/1994 | Takahata et al. | 502/66 |
| 5,382,416 | 1/1995 | Nakano et al. | 423/213.2 |
| 5,538,697 | 7/1996 | Abe et al. | 422/171 |

FOREIGN PATENT DOCUMENTS

| | | | |
|---|---|---|---|
| 0562516 | 9/1993 | European Pat. Off. | 423/213.5 |
| 580389 | 1/1994 | European Pat. Off. | |
| 613714 | 9/1994 | European Pat. Off. | |
| 3502866 | 3/1986 | Germany | 423/213.7 |
| 5017394 | 2/1975 | Japan . | |
| 6470131 | 3/1989 | Japan | 423/213.5 |
| 1135541 | 5/1989 | Japan . | |
| 7108172 | 4/1995 | Japan . | |
| 2238784 | 6/1991 | United Kingdom . | |

METHOD FOR USING A REGENERABLE CATALYZED TRAP

BACKGROUND OF THE INVENTION

1. Field of The Invention

The present invention is broadly concerned with the abatement of pollutants and especially with abatement of pollutants such as sulfur oxides ("$SO_x$") and phosphorous or phosphorous compounds, e.g., phosphorous oxides (collectively, "$PO_x$") which poison catalysts used to abate other pollutants in gaseous streams containing $SO_x$ and/or $PO_x$ and the like. Specifically, the present invention is concerned with a novel method of pollution abatement in gaseous streams and an apparatus for carrying out the method comprising a trap member having thereon an intimate combination of a sorbent material and an oxidation catalyst.

2. Related Art

It is well-known in the art to utilize catalyst compositions to treat gaseous streams such as the exhaust gases of internal combustion engines. It is also well known that $SO_x$ and $PO_x$ tend to poison, i.e., inactivate, many catalysts used for such treatment. $SO_x$ is a particular problem inasmuch as it is generated by the oxidation of sulfur compound impurities often found in gasoline and diesel fuel. $PO_x$ is often generated from phosphorous compounds in engine lubricating oils. It is known in the art to place a guard (e.g., alumina) or filter ahead of or on the surface of catalyst compositions to attempt to protect the catalyst from $SO_x$ and/or $PO_x$. However, difficulties are encountered when the guard or filter becomes saturated with $SO_x$ and/or $PO_x$.

The art shows the use of materials which combine sorbents and catalysts. This is shown, for example, at pages 45–48 of the publication *Environmental Catalysis For A Better World And Life*, Proceedings of the 1st World Congress at Pisa, Italy, May 1–5, 1995, published by the Societa Chimica Italiana of Rome, Italy, in an article entitled "The New Concept 3-Way Catalyst For Automotive Lean-Burn Engine Storage and Reduction Catalyst", by Takahashi et al. This article deals with $NO_x$ abatement in lean $NO_x$ gases and shows materials comprising precious metals, mainly platinum, and various alkaline and alkaline earth metal oxides, mainly barium oxide and rare earth metal oxides, disposed on supports such as alumina. At page 47 of the article, there is disclosed the concept of employing $NO_x$ storage compounds and catalytic components dispersed on a common support material.

U.S. Pat. No. 5,202,300, "Catalyst For Purification of Exhaust Gas", issued on Apr. 13, 1993, to M. Funabiki et al, discloses a catalyst composition comprising a refractory support having deposited thereon an active layer containing a palladium and rhodium catalytic metal component dispersed on alumina, a cerium compound, a strontium compound and a zirconium compound.

SUMMARY OF THE INVENTION

Generally, the present invention provides a method for sorbing a sorbable component such as $SO_x$ or $PO_x$ from a lean gaseous stream onto a catalyzed trap member during a trapping period, the trap member comprising a combination of a sorbent material and an oxidation catalyst. The method includes thermally desorbing the sorbable component during a desorbing period by oxidizing a combustible component in the presence of the oxidation catalyst to heat at least part of the surface (e.g., the gas flow passage walls) of the trap member to a temperature well above the bulk temperature of the gaseous stream being treated. One application of the invention involves sending the gaseous stream to a first zone during the trapping period and to a different, second zone during the desorbing period.

Specifically, in accordance with the present invention there is provided a method for removing a sorbable component, e.g., $SO_x$ and/or $PO_x$, from a gaseous stream containing the same. The method comprises the following steps. In a trapping period, the gaseous stream is passed within a sorbing temperature range through a catalyzed trap member comprising a combination of a regenerable sorbent material and an oxidation catalyst, so that at least some of the sorbable component is sorbed into the sorbent material to thereby provide a sorbable component-depleted gaseous stream exiting the catalyzed trap member. In a desorbing period, a combustible component is introduced into the gaseous stream upstream of the catalyzed trap member and combusted in the presence of the oxidation catalyst, the combustible component being introduced in an amount which is limited in order to maintain the bulk composition of the gaseous stream lean but which is enough to heat at least a portion of the sorbent material to within a desorbing temperature range to thereby thermally desorb the component from the sorbent material and provide a sorbable component-enriched gaseous stream exiting the catalyzed trap member.

In one aspect of the invention, the method comprises controlling combustion during the desorption period to maintain at least portions of the surface of the catalyzed trap member at a temperature above the bulk temperature of the sorbable component-enriched gaseous stream. The sorbable component-depleted stream is passed to a first zone and the sorbable component-enriched stream is passed to a second zone.

In another aspect of the present invention, the sorbable component comprises $SO_x$; in a related aspect, the gaseous stream also contains a pollutant component and the first zone comprises a catalytic treatment zone for abatement of the pollutant component and the second zone comprises a $SO_x$ disposal zone.

In another aspect of this invention, the pollutant component comprises $NO_x$ and the first zone comprises a catalytic lean $NO_x$ abatement zone which may comprise a $NO_x$ abatement catalyst having an effective operating temperature range below the desorbing temperature range of the $SO_x$. The method may then comprise passing the $SO_x$-depleted stream to the catalytic $NO_x$ abatement zone at a temperature within the effective operating temperature range for lean $NO_x$ reduction.

The sorbable component may be selected from the group consisting of one or both of $SO_x$ and $PO_x$.

In another aspect of the invention, the sorbent material used in the method comprises at least one basic oxygenated compound and the oxidation catalyst comprises a catalyst selected from the group consisting of one or more platinum group metal catalytic components, preferably a platinum catalytic component.

In accordance with the present invention there is also provided a thermally regenerable composition for sorbing a sorbable component from a gas stream, the composition comprising an oxidation catalyst and a regenerable sorbent material disposed in segregated combination with each other on a common refractory carrier member. The oxidation catalyst comprises at least one catalytic metal component, e.g., a platinum group metal, preferably platinum, dispersed on a first support material. The sorbent material comprises at least one basic oxygenated metal compound which is segregated from the first catalytic metal component at least to the extent that (a) when the sorbent material is dispersed on a support material, the catalytic metal component and the sorbent material are not dispersed on the same increment of support material, and (b) when the sorbent material is in bulk form, the catalytic metal component is not incorporated into the bulk sorbent material.

Other aspects of the present invention provide the following features alone or in combination: the sorbent material may be selected from the group consisting of one or more of metal oxides, metal carbonates, metal hydroxides and mixed metal oxides; the metals of the metal oxides, metal hydroxides and metal carbonates and at least one of the metals of the mixed metal oxides may be selected from the group consisting of one or more of magnesium, calcium, strontium, barium and lanthanum (the resulting compounds being designated group A compounds); the sorbent material may further or alternatively comprise one or more metal oxides selected from the group consisting of oxides of ceria, praseodymia and elements of atomic numbers from 22 through 29 inclusive (the resulting compounds being designated group B compounds); the group A compounds may comprise from about 50 to 95 percent by weight of the combined weight of the group A compounds and the group B compounds when at least one compound from each group is present; when one or more of the group A compounds and one or more of the group B compounds are present in bulk form, they may be admixed in the same layer of sorbent material; and one or more of the group A compounds and one or more of the group B compounds may be supported on the same increment of support material. (The elements of atomic numbers 22 through 29 are titanium, vanadium, chromium, manganese, iron, cobalt, nickel and copper.)

Other composition aspects of the present invention provide that a portion only, e.g., at least 50% by weight of the oxidation catalyst present, need be segregated from the sorbent material. Another composition aspect of the present invention provides that the composition may further comprise a second oxidation catalyst moiety which is present in an amount sufficient to enhance the $SO_x$ sorption capability of the sorbent material. (Without wishing to be bound by any particular theory, it is believed that sorption is promoted by oxidizing $SO_2$ to $SO_3$.)

An apparatus aspect of the present invention provides an apparatus for removing a sorbable component from a gaseous stream containing the same. The apparatus comprises the following components: an inlet conduit which is dimensioned and configured for connection in flow communication to a source of a gaseous stream containing the first component; a catalyzed trap member having a trap inlet and a trap outlet, the trap inlet being connected in flow communication to the inlet conduit, the trap member comprising an intimate combination of a regenerable sorbent material and a catalyst material effective for promoting the oxidation of a combustible component in such gaseous stream; an outlet conduit connected to the trap outlet; combustible component inlet means connected in flow communication to the inlet conduit; and control means associated with the inlet conduit to permit intermittent injection of a combustible component into the inlet conduit.

The catalyzed trap member of the apparatus may comprise the composition as described above.

As used herein and in the claims, the following terms, whether used in singular or plural form, have the indicated meanings.

Reference to a "catalytic metal component", or to a "platinum metal component", or to a metal or metals comprising the same, means a catalytically effective form of the metal or metals, whether the metal or metals are present as the element, or an alloy or a compound, e.g., an oxide.

The term "platinum group metals" means and includes platinum, rhodium, palladium, ruthenium, iridium and osmium.

The term "washcoat" has its usual meaning in the art of a thin, adherent coating of a catalytic or other material applied to a refractory carrier material such as a honeycomb-type carrier member, and which is porous to permit the passage therethrough of the gas stream being treated.

The term "gaseous stream" means a stream of gaseous constituents, such as the exhaust of an internal combustion engine, which may contain entrained non-gaseous components such as liquid droplets, solid particulates and the like.

The abbreviation "TOS" means time on stream and the abbreviation "HC" means hydrocarbon.

The use of weight per volume units such as "$g/in^3$" or "$g/ft^3$" describes the weight of a component per volume of catalyst or trap member including the volume thereof attributed to void spaces such as gas-flow passages.

A "bulk" component means a component which is present as fine, solid particles, i.e., as a powder. The particles are usually quite small in size, on the order of, e.g., at least ninety percent of the particles being from 1 to 15 microns in diameter. For example, a bulk sorbent material is a powder of strontium oxide.

A component is "dispersed" onto a bulk support material by immersing the bulk support material into a solution or other liquid suspension of the component or a precursor thereof. For example, the sorbent strontium oxide may be dispersed onto an alumina support material by soaking bulk alumina in a solution of strontium nitrate (a precursor of strontia), drying the soaked alumina particles and heating them, e.g., in air at a temperature of 450° C. to 750° C. (calcining) to convert the strontium nitrate to strontium oxide dispersed on the alumina support materials.

The term "lean" used with reference to a mode of treatment (such as "lean $NO_x$ abatement") or a gaseous stream, means that the gaseous stream being subjected to the treatment, or the gaseous stream referred to, contains more oxygen that the stoichiometric amount of oxygen needed to oxidize the entire reductants content, e.g., HC, CO and $H_2$, of the gaseous stream.

The term "increment" of a support material means a batch or portion of support material; references to components not being disposed on the same "increment" of support material simply means that the components are not dispersed on the same particles, but each component is dispersed on its own batch of particles.

The term "mixed metal oxide" means bi-metallic or multi-metallic oxygen compounds, such as $Ba_2SrWO_6$, which are true compounds and is not intended to embrace mere mixtures of two or more individual metal oxides such as a mixture of SrO and BaO.

The term "segregated combination" or "in segregated combination with each other" used with reference to the sorbent material and the oxidation catalyst means that the sorbent material and the oxidation catalyst are either admixed with each other or disposed in respective discrete layers which overlie each other. The term "combination" without the modifier "segregated" encompasses segregated and non-segregated combinations and thus includes combinations in which there is intimate contact between the oxidation catalyst and the sorbent material, such as when the oxidation catalyst is incorporated into, i.e., dispersed onto, the sorbent material, or when the sorbent material and the oxidation catalyst are dispersed onto the same increment of support material.

The term "sorb" means to effect sorption.

Other aspects of the invention are disclosed in the following detailed description of embodiments of the invention.

DETAILED DESCRIPTION OF THE INVENTION AND SPECIFIC EMBODIMENTS THEREOF

The present invention is based on the finding that a catalyzed trap member containing a sorbent material for sorbing sorbable components such as $SO_x$ and/or $PO_x$ contained in a lean gaseous stream, or at least part or all of the sorbent material on the trap member, may be locally heated to a desorption temperature which is higher than the bulk temperature of the gaseous stream by the introduction of a combustible component into the gaseous stream being fed to the trap member. A suitable oxidation catalyst is combined with the sorbent material on the trap member, the oxidation catalyst serving to promote combustion of the combustible component at or very close to the sorbent material. The combustible component is added in an amount limited to maintain the lean composition of the gaseous stream. The invention also provides a composition comprising the sorbent material in a segregated combination with the oxidation catalyst which can be attained either by admixing the sorbent material and the oxidation catalyst before disposing them on the carrier member, or by applying them onto the carrier member in respective, discrete, overlying layers. Without wishing to be bound by any particular theory, it is believed that the segregation may enhance the durability of the composition by preventing deleterious interaction between the oxidation catalyst and the sorbent material.

The combustible component is periodically introduced into the gaseous stream being fed to the trap member to initiate desorbing periods to regenerate the sorbent material. During such desorbing periods oxidation conditions are maintained at the trap member, including maintaining sufficient oxygen and a temperature high enough for the oxidation catalyst to promote combustion of the combustible component. Many gaseous streams, such as the exhaust of a diesel engine, are inherently at such oxidation conditions. For example, the temperature of diesel exhaust introduced into the $SO_x$ trap member will typically be from about 50° to 750° C. and the oxygen content will be from about 3 to 19 volume percent. The amount of combustible component introduced is controlled to provide sufficient heating of at least portions of the sorbent material on the trap member to thermally desorb at least some of the sorbable component previously sorbed thereon. By limiting the amount of combustible component introduced, the surface temperature of at least parts of the catalyzed trap member is raised sufficiently to thermally desorb the $SO_x$ without raising the bulk temperature of the gaseous stream to that of the surface of the catalyzed trap member.

Figure 1:
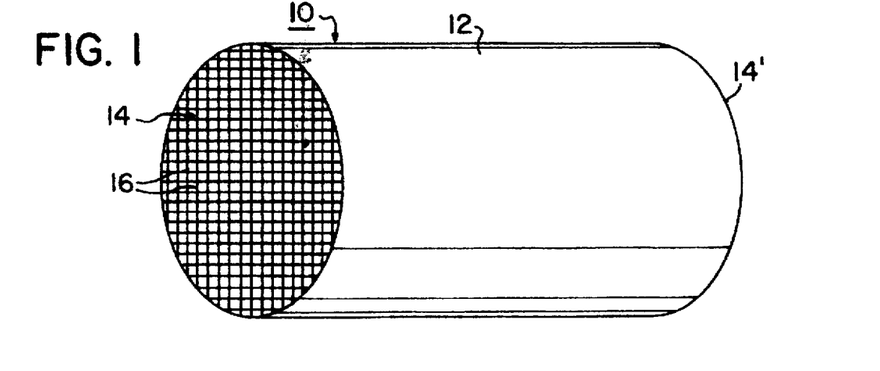
FIG. 1 is a perspective view of a catalyst/trap composition comprising a honeycomb-type refractory carrier member in accordance with one embodiment of the present invention.
Figure 1A:
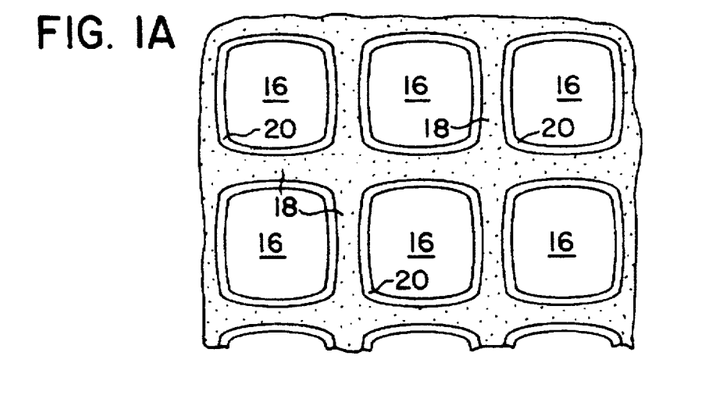
FIG. 1A is a partial cross-sectional view enlarged relative to FIG. 1 and taken along a plane parallel to the end faces of the carrier of FIG. 1.
Figure 1B:
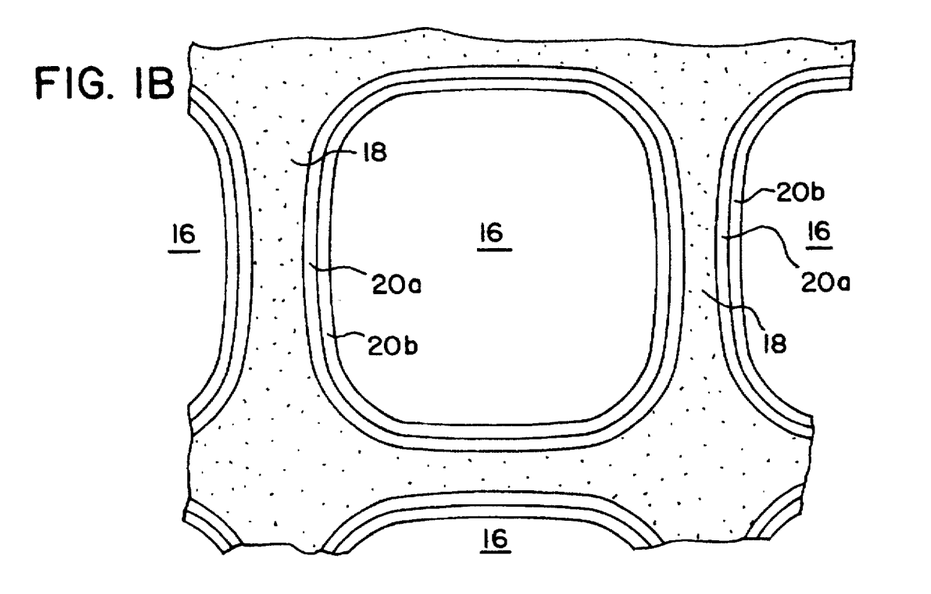
FIG. 1B is a view enlarged relative to FIG. 1A of one of the gas-flow passages shown in FIG. 1A.

FIG. 1 shows generally at 10 a refractory carrier member of generally cylindrical shape having a cylindrical outer surface 12, one end face 14 and an opposite end face, not visible in FIG. 1, which is identical to end face 14. The junction of outer surface 12 with the opposite end face at its peripheral edge portion is indicated at 14' in FIG. 1. Carrier member 10 has a plurality of fine, parallel gas-flow passages 16 formed therein, which are better seen in enlarged FIGS. 1A and 1B. Gas-flow passages 16 are formed by walls 18 and extend through carrier 10 from end face 14 to the opposite end face thereof, the passages 16 being unobstructed so as to permit the flow of a fluid, e.g., a gaseous stream, longitudinally through carrier 10 via gas-flow passages 16 thereof. A layer 20, which in the art and sometimes below is referred to as a "washcoat", is adhered to the walls 18 and, as shown in FIG. 1A, may be comprised of a single layer comprising a mixture of oxidation catalyst and $SO_x$ sorbent material. Alternatively, as illustrated in FIG. 1B, layer or washcoat 20 may comprise a first discrete underlayer 20a and a second discrete overlayer 20b superposed over underlayer 20a. The underlayer 20a preferably is comprised of the oxidation catalyst and the overlayer 20b is preferably comprised of the sorbent material. However, the arrangement of the layers may be reversed, with the underlayer 20a comprised of the sorbent material and the overlayer 20b comprised of the oxidation catalyst. For purposes of illustration, the thickness of washcoat 20, underlayer 20a and overlayer 20b are exaggerated in FIGS. 1A and 1B.

The refractory carrier member alternatively may comprise a body of beads, pellets or particles (collectively referred to as "carrier beads") made of a suitable refractory material such as gamma-alumina, coated with the oxidation catalyst and the $SO_x$ sorbent material. A body of such carrier beads may be contained within a suitable perforated container which permits the passage of the exhaust gas therethrough. A proportion, e.g., approximately one-half, of the carrier beads may have the oxidation catalyst coated thereon and the remainder may have the $SO_x$ sorbent material coated thereon with the two types of carrier beads thoroughly admixed. Alternatively, all the carrier beads may be coated with both the oxidation catalyst and the $SO_x$ sorbent material, preferably in discrete respective layers thereof, and most preferably with the layer of $SO_x$ sorbent material superposed over the layer of oxidation catalyst. The $SO_x$ sorbent material is permeable to the gaseous components of the combustible component and to the gaseous stream generally, as is the oxidation catalyst, so that the gaseous stream and the combustible component may readily penetrate both layers of material.

Because the passages 16 of the carrier member 10 of FIGS. 1, 1A and 1B and the interstices between the beads of a carrier bead embodiment provide void spaces, the total volume of such void space in a given trap member (or catalyst member) will vary depending on the specific dimensions and shape of the carrier beads or of passages 16 and walls 18, it is conventional practice to express the quantity of the components of the member as weight per unit volume of the member body. Therefore, quantities of the components of such members may be described herein in terms of grams per cubic foot ("g/ft$^3$") or grams per cubic inch ("g/in$^3$"), the volume in each case being the volume of the member.

Figure 2:
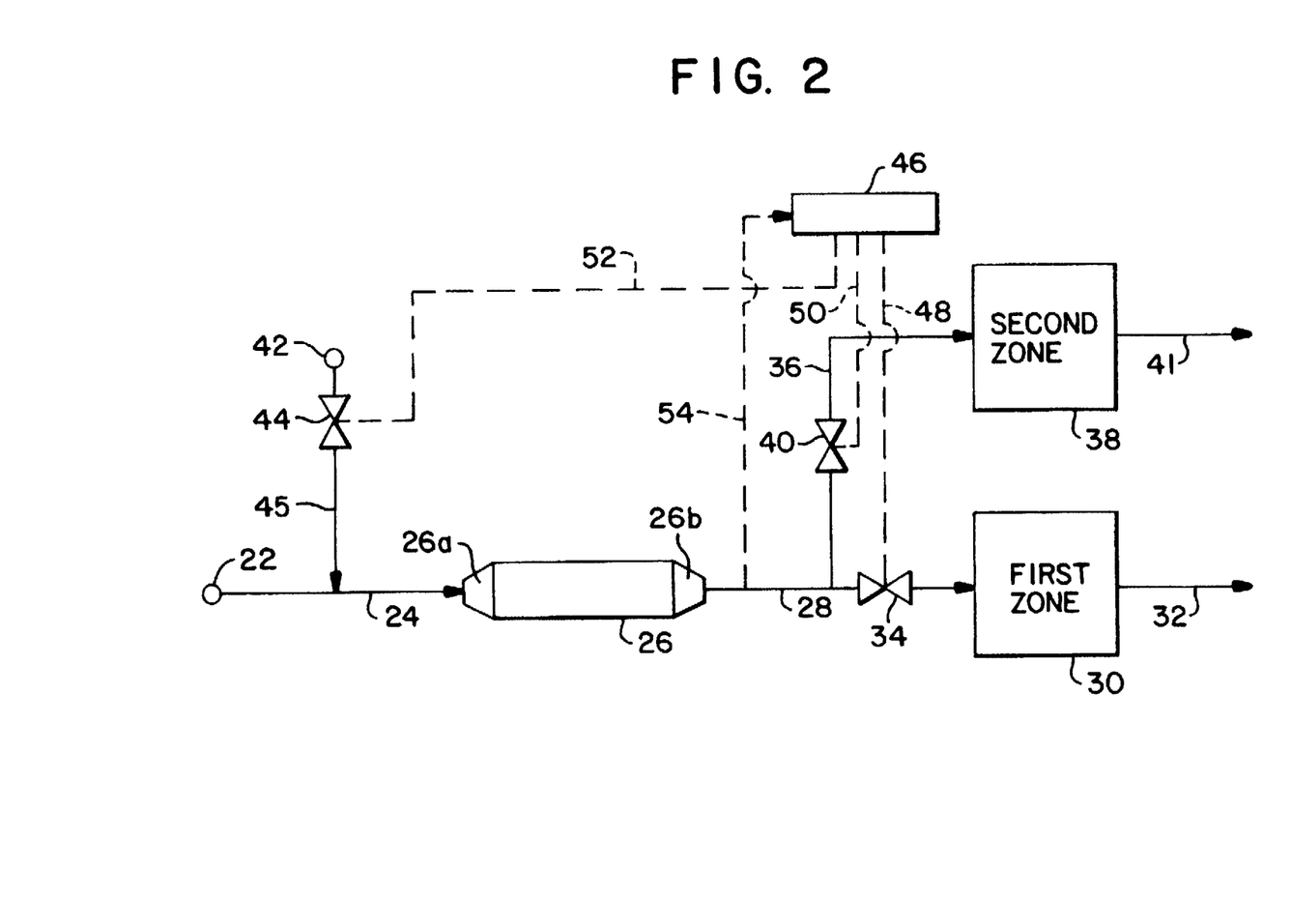
FIG. 2 is a schematic diagram of an apparatus for removing a sorbable component from a gaseous stream in accordance with one embodiment of the present invention.

An apparatus in accordance with one embodiment of the present invention is illustrated in FIG. 2 wherein a source 22 of a gaseous stream to be treated has an exhaust pipe 24 which conveys the gaseous stream from source 22. Source 22 may comprise an internal combustion engine, e.g., a diesel engine, and the gaseous stream may accordingly comprise an engine exhaust stream. Source 22 may also comprise a stationary source, such as a power plant or a chemical or petrochemical plant or any other source of a treatable exhaust or discharge. In any case, exhaust pipe 24 conveys the gaseous stream to a trap canister 26, which may comprise a suitable canister having mounted therewithin a trap member such as carrier member 10 of FIG. 1 having deposited thereon a suitable washcoat 20 in accordance with the present invention. Canister 26 has an inlet means 26a which is dimensioned and configured to have secured thereto in gas-flow communication exhaust pipe 24. At its opposite end, canister 26 has an outlet means 26b which is dimensioned and configured to have secured thereto in gas-flow communication, a connector conduit 28, the opposite end of which is connected in gas-flow communication to a first zone 30, which may comprise a catalytic treatment zone, e.g., a catalytic NO$_x$ abatement zone. First zone 30 has an outlet line 32 for discharge of the gaseous stream therefrom. A first control valve 34 is disposed in connector conduit 28 between a branch conduit 36 and first zone 30. Branch conduit 36 leads to a second zone 38 and has a second control valve 40 disposed therein between connector conduit 28 and second zone 38. A discharge line 41 leads from second zone 38.

A source 42 of a combustible component, e.g., the fuel tank of the engine which may comprise the source 22 of the gaseous stream, is connected by a combustible component inlet means comprising in the illustrated embodiment a combustible component inlet line 45 which has a valve 44 disposed therein and is connected in flow communication with exhaust pipe 24.

In the illustrated embodiment a control means 46 is operatively connected via first control line 48 to first control valve 34, via second control line 50 to second control valve 40 and via third control line 52 to third control valve 44. Control means 46 receives control signals via input line 54 which, in the illustrated embodiment, is connected to a sensor (not shown) disposed within exhaust pipe 24 to sense the concentration of the sorbable component, e.g., SO$_x$, of the gaseous stream in exhaust pipe 24. Any other suitable source of a control signal may be used, such as time lapse or signals from sensors placed in the exhaust pipe 24 to monitor temperature, combustible component content, or any other suitable parameters. As noted above, the sorbable component may be SO$_x$, PO$_x$ or other sorbable catalyst poisons or pollutants. However, as SO$_x$ is the most commonly encountered catalyst poison in treating the exhaust of fuel burning operations, for economy of expression the following discussions will refer to SO$_x$ although it will be appreciated that the discussion applies as well to other sorbable components of the gaseous stream.

In operation, the gaseous stream emanating from source 22 is transmitted by exhaust pipe 24 to the SO$_x$ trap member contained within canister 26, the bulk temperature of the gaseous stream being within a sorbing temperature range whereby SO$_x$ contained in the gaseous exhaust is sorbed onto the SO$_x$-sorbent material. During this trapping period third control valve 44 is closed so that the added combustible components are not fed into the gaseous stream entering SO$_x$ trap canister 26. The gaseous stream from source 22 may be, for example, the exhaust of a diesel engine using a sulfur-containing fuel. Consequently, the gaseous stream contains both SO$_x$ and NO$_x$ and is introduced into canister 26 wherein it contacts a catalyzed trap member such as the carrier member 10 illustrated in FIG. 1, containing a washcoat 20 comprising a combination of a sorbent material for SO$_x$ and an oxidation catalyst. At this stage, valves 40 and 44 are closed and valve 34 is open. During a trapping period, SO$_x$ is sorbed from the gaseous stream by the sorbent material and the SO$_x$-depleted gaseous stream passes through connector conduit 28 and valve 34 to a first zone 30, which may comprise, for example, a catalytic treatment zone for abatement of NO$_x$ in the lean gaseous stream or for any other catalytic treatment of a lean gaseous stream. In the case where first zone 30 comprises a lean NO$_x$ abatement zone, the catalyst employed therein may comprise platinum on a metal oxide support, or platinum or copper on a zeolite support, or a trimetallic (copper, cobalt plus nickel) catalyst on a zeolite support. Many catalysts such as lean NO$_x$ abatement catalysts are subject to poisoning by SO$_x$ (or PO$_x$) and so trap canister 26 serves to protect the catalyst in first zone 30 from poisoning. After treatment in first zone 30, the treated gaseous stream is then discharged therefrom via outlet line 32 to the atmosphere or to additional treatment, although the latter is usually not necessary.

As the sorbent material contained within catalyzed trap member 26 accumulates SO$_x$, its sorbent capacity will eventually be used up. At or prior to this occurring, the sorbent material is regenerated by thermally desorbing SO$_x$ from the sorbent material. This may be accomplished by providing an input signal via signal input line 54 to control means 46 to have it send signals via first, second and third control lines 48, 50 and 52 to close valve 34 and to open valves 40 and 44. The signal transmitted via signal input line 54 may be generated by a sensor (not shown) positioned in connector conduit 28, the signal being generated in response to one or more selected parameters, usually to an increase of SO$_x$ concentration in the gaseous stream in connector conduit 38, indicating that the sorbent material is approaching or has reached saturation and there is an impending breakthrough of SO$_x$, or a breakthrough has started. Alternatively, the signal may be based on a pre-selected period of time having passed since the last desorbing period. In any case, the signal causes control means 46 to send signals via first, second and third control lines 48, 50 and 52 to close first control valve 34 and open second and third control valves 40 and 44. With valve 44 open, a combustible component such as a hydrocarbon, e.g., diesel fuel, flows into exhaust pipe 24 via inlet line 45 and is oxidized within canister 26 in the presence of the oxidation catalyst therein contained, and thereby raises the temperature of the sorbent material sufficiently to thermally desorb SO$_x$ from the SO$_x$ sorbent material to thereby provide a SO$_x$-enriched gaseous stream which flows via connector conduit 28 and branch conduit 36 through second zone 38. Second zone 38 may be a treatment zone utilizing scrubbers or the like to remove $SO_x$ and/or other compounds from the gaseous stream. Alternatively, second zone 38 may simply be a discharge to the atmosphere if governmental regulations and other considerations permit such discharge. In such case, the untreated gaseous stream is passed via discharge line 41 to the atmosphere.

Sufficient regeneration of the sorbent material may be evidenced by a reduced $SO_x$ content sensed in connector conduit 28 and transmitted to control means 46 via signal input line 54. In response, a signal from control means 46 via first, second and third control lines 48, 50 and 52 closes valve 44 and then valve 40, allowing enough time between these valve closings to purge the combustible component and its combustion products from the system via second zone 38, and thus ending the desorbing period. Valve 34 is then opened to re-start the trapping period and convey a $SO_x$-depleted gaseous stream to first zone 30 while $SO_x$ is being sorbed by the catalyzed trap member contained within canister 26 in a new first or trapping period.

The apparatus schematically illustrated in FIG. 2 requires that the gaseous stream being treated bypass the first zone 30 during the desorbing. However, those skilled in the art will appreciate that an alternate arrangement, not illustrated, could provide two trap canisters 26 in parallel, so that the gaseous stream emanating from source 22 could be treated in one of the two trap canisters 26 and passed to the first zone while the second trap canister was being regenerated. In yet another embodiment, a conduit with suitable valving (not shown) could arrange to bypass the single trap canister 26 to direct the gaseous stream to the first zone 30 for treatment while the single trap canister 26 was being desorbed and its $SO_x$ (or other sorbable component)-enriched stream was being diverted to second zone 38. This latter scheme has the disadvantage that the gaseous stream with its content of $SO_x$ or other catalyst poison will contact the catalyst contained in the first zone 30 during the desorption period.

The $SO_x$ Sorbent Material

Generally, the $SO_x$ sorbent material comprises at least one basic oxygenated metal compound and, as indicated above, may either be dispersed onto a refractory support material such as activated alumina, or may be present in bulk form, i.e., as fine particles of the basic oxygenated metal compound. As used herein and in the claims, an "oxygenated metal compound" means a compound of metal and oxygen which may or may not contain other elements. For example, the basic oxygenated metal compound may comprise one or more of a metal oxide, a metal carbonate, a metal hydroxide or a mixed metal oxide. The metal of such compounds (at least one of the metals in the case of the mixed oxides) is preferably selected from the group A and/or group B compounds defined elsewhere herein. Strontium oxide and barium oxide have both been found to be especially useful $SO_x$ sorbent materials. The $SO_x$ sorbent material will be present in an amount calculated to provide adequate sorption for the intended use. A typical quantity of the basic metal oxygenated compound will be from about 0.05 to 3 g/in$^3$ of the catalyzed trap member.

The sorbent material may comprise a mixture of two or more compounds which compounds are arbitrarily described herein as either group A compounds or group B compounds. Generally, the group A compounds are believed to be more strongly adsorbing materials, especially with respect to $SO_x$, than the group B compounds. Without wishing to be bound by any particular theory, it is believed that by combining the weaker adsorbing compounds of group B with the stronger adsorbing compounds of group A, the regeneration characteristics of the sorbent material may be enhanced.

The Oxidation Catalyst

The oxidation catalyst may be any suitable catalyst which will catalyze the oxidation of hydrocarbons in a gaseous stream in the presence of oxygen. The gaseous stream treated by the present invention must contain, or have added to it, sufficient oxygen to support the catalyzed oxidation of the combustible component. Inasmuch as diesel engines inherently operate in a lean mode, the exhaust of a diesel engine inherently contains more than sufficient oxygen for the purposes of the present invention. While any suitable oxidation catalyst may be utilized, the preferred catalyst is one comprising platinum either alone or in combination with other platinum group metals such as palladium and rhodium, dispersed on a refractory metal oxide support, preferably a high surface area metal oxide support such as activated alumina. Thus, a suitable oxidation catalyst may comprise platinum dispersed on alumina, platinum plus rhodium dispersed on alumina, etc.

Combinations of Sorbent Material and Oxidation Catalyst

The compositions of the present invention comprise segregated combinations of the sorbent material and oxidation catalyst. In a segregated combination, discrete particles of the oxidation catalyst and of the sorbent material are mixed in the same washcoat layer or are disposed in separate discrete layers with one overlying the other. In either case, a degree of segregation between the sorbent material and the oxidation catalyst is maintained despite the close physical proximity of particles of the two. For example, as set forth elsewhere herein and defined in the claims, if the sorbent material is dispersed onto particles of a support material, i.e., by immersing an increment of alumina particles in a solution of a strontium salt and then drying and calcining the soaked particles to convert the strontium salt to strontia dispersed on the alumina particles, then the oxidation catalyst, or at least a portion of it in some cases, is not dispersed onto the same increment of particles as the sorbent material. Similarly, if the sorbent material is present in bulk form, i.e., as fine particles of the sorbent material, e.g., fine particles of calcia, strontia or baria, those particles in some cases will not have the oxidation catalyst dispersed thereon by the immersion/calcining technique described above. However, in the practice of the method of this invention, it has been found that adsorption activity of the sorbent material, especially for $SO_x$, may be enhanced by providing at least a portion of the oxidation catalyst in a non-segregated combination with the sorbent material, i.e., in an intimate combination or in intimate contact therewith. In compositions of the present invention, some of the oxidation catalyst may be in intimate contact with the sorbent material as a second catalytic metal moiety, as discussed below. In such case, the oxidation catalyst in segregated combination with the sorbent material is the first oxidation catalytic metal moiety.

Second Oxidation Catalytic Metal Moiety

In compositions of the present invention, a limited amount of a second oxidation catalytic metal moiety may be placed into intimate contact with the sorbent material. The second oxidation catalytic moiety may comprise at least one platinum group metal component, preferably, platinum, and may optionally be the same as the first moiety. If the optional second moiety is present, it will either be incorporated into the support particles on which the sorbent material may be dispersed, or it will be dispersed into the sorbent material if the latter is present in bulk form, to establish intimate contact between them. The method of this invention, however, may optionally be practiced with a catalyzed trap member in which all the oxidation catalyst is in intimate contact with the sorbent material.

Without wishing to be bound by any particular theory, it is believed that the intimate contact between the oxidation catalyst and the sorbent material may facilitate the sorption function of the sorbent material. However, in compositions of the present invention, at least about half of the oxidation catalyst metal present may be segregated from the sorbent material. If the entire quantity of the oxidation catalyst in the catalytic material were to be placed in the same intimate contact with the sorbent material, it is believed that the oxidation catalyst could be rendered less durable in oxidizing the combustible component as is required in order to carry out the method of the present invention.

The system of FIG. 2 can be used in a large number of applications, because $SO_x$ contaminates most catalysts, especially those abatement catalysts used in environmental applications. A suitable $SO_x$ trap placed upstream of the abatement catalyst system can be used to sorb the $SO_x$ content of the gaseous stream to be treated and periodic combustion of the combustible component can be used in the $SO_x$ trap to desorb and/or decompose $SO_x$ to $SO_2$. Desorbing of $SO_3$ is generally not acceptable because of the environmental problems it poses in general and because it increases the weight of particulates in applications such as the treatment of diesel exhaust. During the desorption cycle, a bypass system is needed to divert the $SO_x$-enriched stream away from the abatement catalyst system, if the latter is present. A large number of sorbent materials are suitable for $SO_x$ absorption and these include all the alkali metal and alkaline earth metal oxides, certain transition metal oxides, such as oxides of manganese, iron, chromium, copper, cobalt, or the like, and rare earth metal oxides, such as ceria, praseodymia, etc. Preferably, the sorbent material is one which, when subjected to thermal desorption by the practices of the present invention, will desorb $SO_2$ rather than $SO_3$.

The following examples illustrate the preparation and testing of specific embodiments of the invention.

EXAMPLE 1
$Pt/CeO_2$ Trap Material

A $Pt/CeO_2$ slurry was prepared by ballmilling 150 g of bulk ceria (i.e., fine particulate ceria) with 225 g of water and 16.84 g of a 18.24 weight percent Pt solution of a soluble platinum salt and 8 ml of acetic acid. The resulting slurry was used to coat a 0.75 inch×1.0 inch substrate such as carrier 10 of FIG. 1 having 400 gas-flow passages (16 of FIG. 1) or cells per square inch of end face area (400 cpsi). The carrier had 2.0 g/in³ of washcoat after calcination at 550° C. for 2 hours, and the Pt oxidation catalyst was in intimate contact with the ceria sorbent material.

Aging

This $Pt/CeO_2$ catalyzed trap member was aged at 500° C. inlet temperature for 17 hours in a feed stream of 10% $O_2$ and 100 ppm $SO_2$ in nitrogen with a space velocity of 25,000/hour, i.e., a flow of 3 liters per minute ("L/min"). After this aging procedure the sample was purged in 10% $O_2$, 10% $H_2O$ in nitrogen at a space velocity at 25,000/hour and 500° C. for about 5 minutes. (Space velocity as used in this specification is the conventionally-used unit of volumes of gas calculated at standard conditions of temperature and pressure passing through the trap member, wherein each volume is the volume of the trap member.)

Test 1

Figure 3:
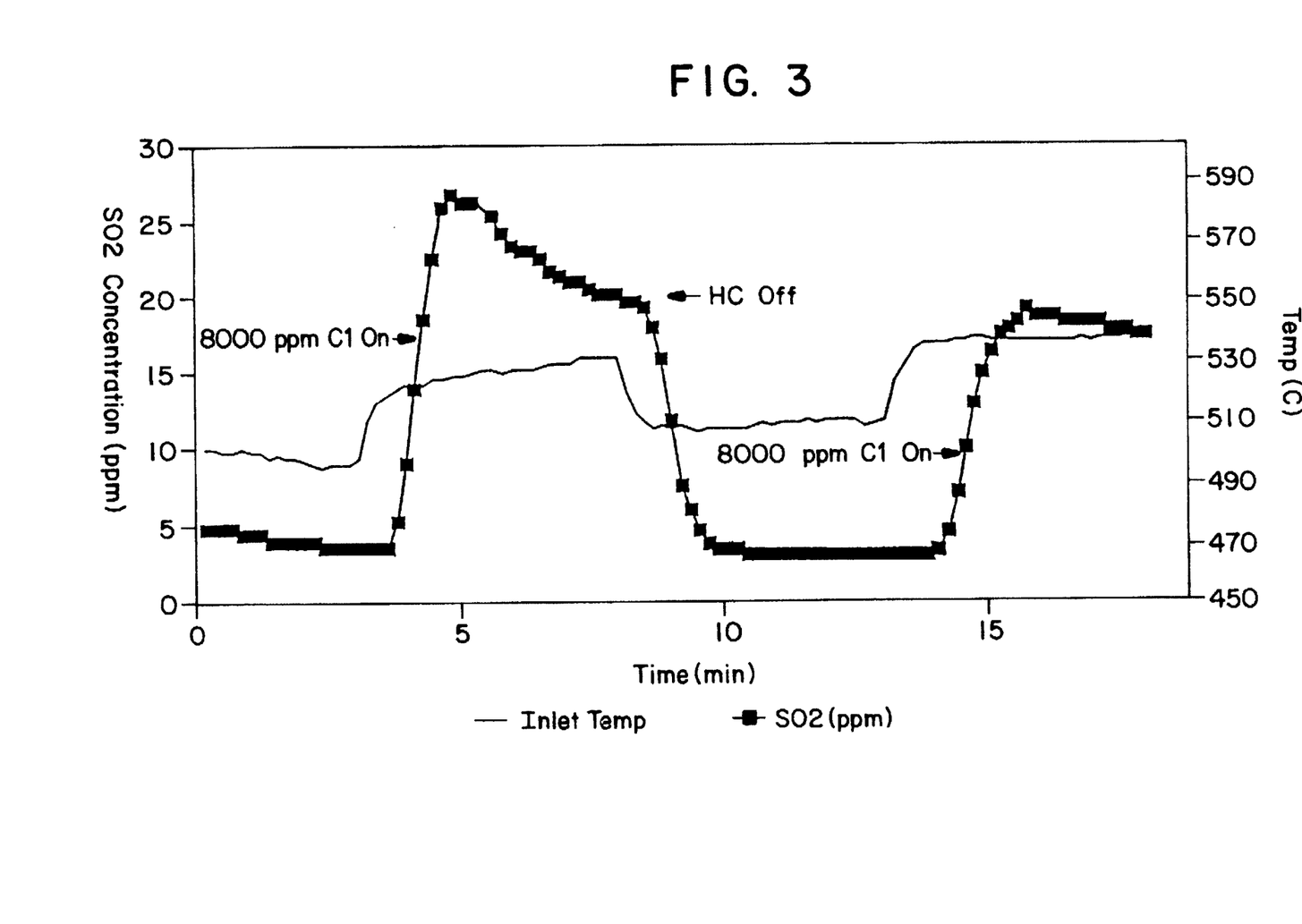
FIG. 3 depicts $SO_2$ desorption using propylene at for inlet gas at 500° C.

The sample was then tested at a 500° C. inlet temperature for $SO_2$ desorption using injected propylene. The results of this test are shown in FIG. 3. In the first 3 minutes of the test the conditions were identical to those described above for purging the sample. Then at 3 minutes time on stream ("TOS"), 8000 ppm $C_1$ (using propylene) was injected into the feed, keeping the total flow and space velocity constant. $SO_2$ desorption of up to 26 ppm was observed in this process. At 8 minutes TOS the propylene was removed from the feed and $SO_2$ desorption quickly fell to less than 5 volume parts per million ("vppm"). At 13 minutes TOS, propylene was again added to the feed and desorption increased.

Test 2

Figure 4:
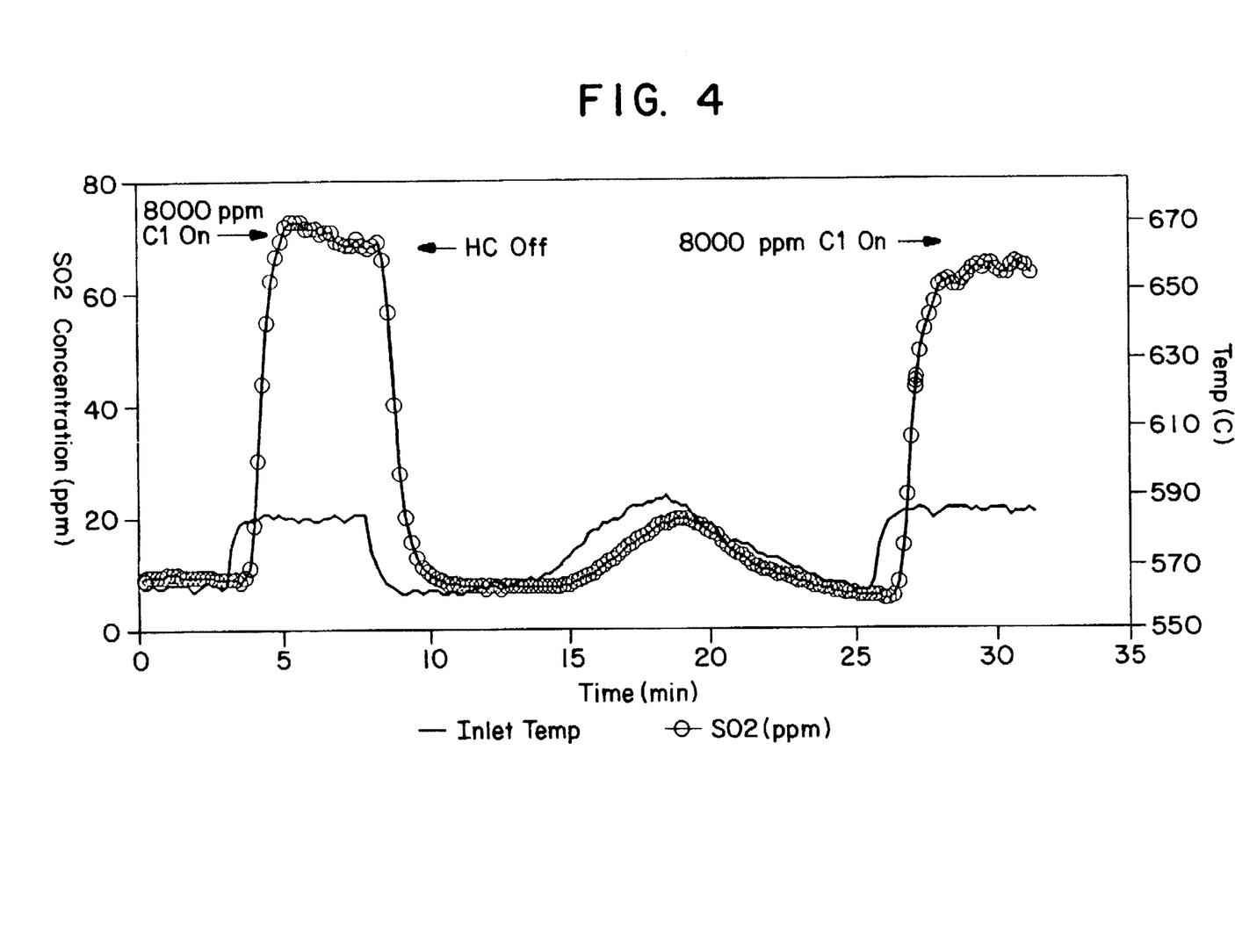
FIG. 4 depicts $SO_2$ desorption using propylene at for inlet gas at 560° C.

After Test 1 described above the same sample trap was heated in a 10% $O_2$, 10% $H_2O$ stream of nitrogen to an inlet temperature of 560° C. After conditions were stable, about 10 minutes, a second test was started to investigate the effect of HC addition on $SO_2$ desorption from this trap at a slightly higher gas inlet temperature. Results of this second test are shown in FIG. 4. From 0–3 minutes TOS the feed consisted of 10% $O_2$ and 10% $H_2O$ in nitrogen. At 3 minutes TOS, 8000 ppm $C_1$ (using propylene) was added to the feed and $SO_2$ desorption of more than 70 vppm was observed. At 8 minutes TOS the propylene was removed from the feed and $SO_2$ desorption quickly decreased to less than 10 ppm. The temperature of the trap was then increased without propylene in the feed to give a trap inlet temperature of about 590° C. and desorption increased to about 20 vppm. From 18–26 minutes TOS the trap was then cooled to an inlet temperature of 560° C. and $SO_2$ desorption decreased to less than 10 vppm as previously observed under these conditions in this test. Then, at 26 minutes TOS, propylene was again added to the feed and $SO_2$ desorption increased as it did the first time to roughly 70 vppm.

During propylene injection, it was typically found that the inlet gas temperature increased somewhat due to the hydrocarbon oxidation process. Because of this, in FIG. 4 trap inlet temperatures are given. During propylene injection, the inlet temperature increased from 560° C. to 585°–590° C. in this test and $SO_2$ desorption increased as well. However, simply increasing the inlet temperature without using an injected hydrocarbon did not result in the same degree of $SO_2$ desorption. The maximum of 20 vppm $SO_2$ which desorbs at a gas inlet temperature of 590° C. (without hydrocarbon injection at about 18 minutes TOS) is substantially less than the roughly 70 vppm $SO_2$ which desorbs during hydrocarbon injection (at the same inlet temperature).

Test 3

Figure 5:
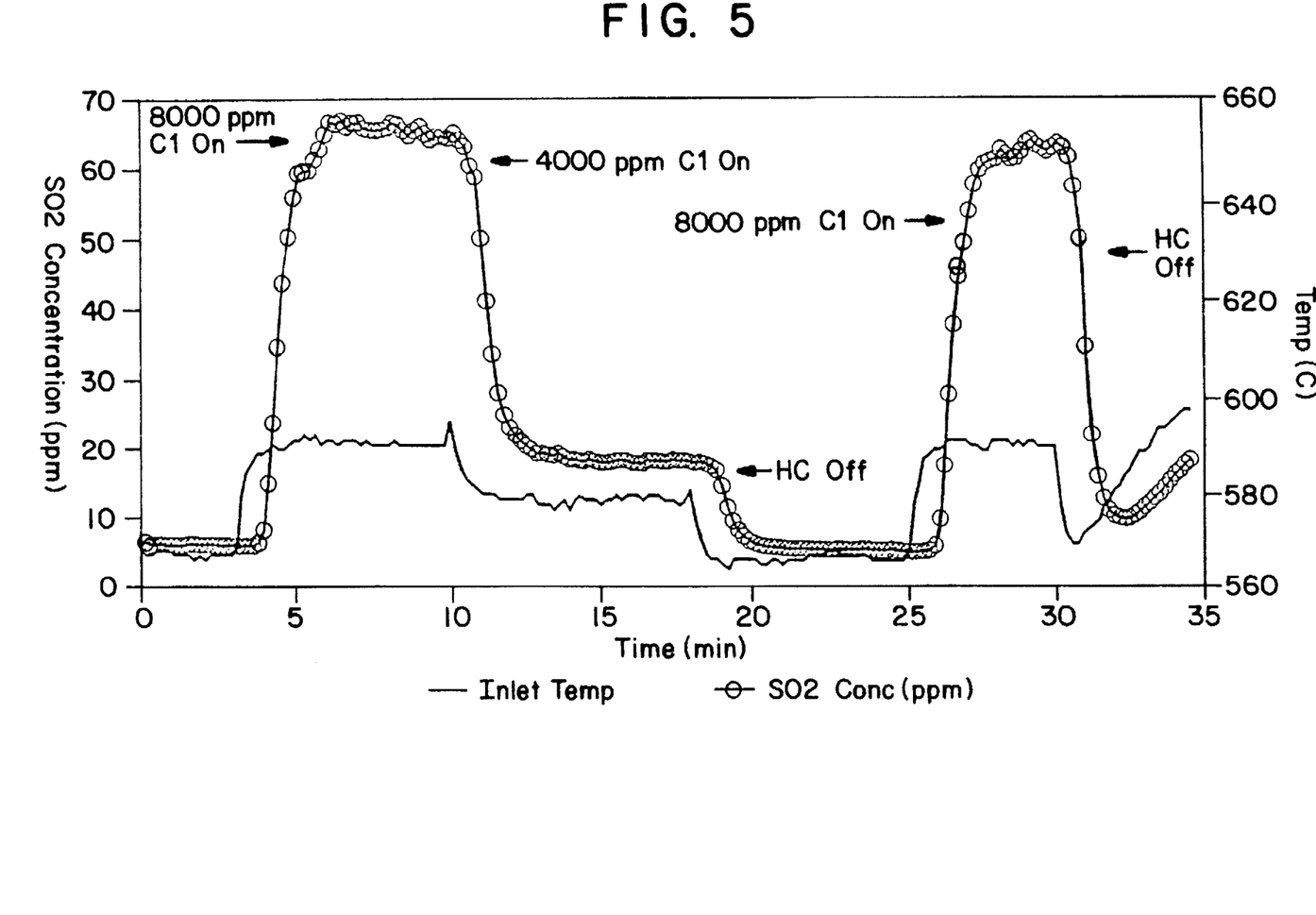
FIG. 5 depicts $SO_2$ desorption using propylene at various concentrations and various inlet temperatures.

After Test 2, the same sample trap was further exposed to various levels of hydrocarbon addition under the same general conditions used in Test 2 at 565°–600° C. inlet temperature. Results are given in FIG. 5 and are summarized in TABLE I below. The "HC (ppm)" heading in TABLE I is volume ppm of $C_1$ (using propylene), the "$SO_2$ ppm" heading is volume ppm, and all temperatures are in degrees centigrade.

TABLE I

| TOS (min) | HC (ppm) | Inlet Temp | $SO_2$ (ppm) |
|---|---|---|---|
| 0–3 | 0 | 565 | <6 |
| 3–10 | 8000 | 590 | ca. 65 |
| 10–18 | 4000 | 580 | ca. 20 |
| 18–25 | 0 | 565 | ca. 7 |
| 25–30 | 8000 | 590 | ca. 65 |
| 30–35 | 0 | inc. to 600 | 18 @ 600° C. inlet temp |

This Test 3 shows that hydrocarbon-induced thermal $SO_2$ desorption will depend strongly on the amount of hydrocarbon injected. This is consistent with the theory that injected hydrocarbon creates local hot spots in the catalyzed trap which lead to $SO_2$ desorption, as the more hydrocarbon which is injected and combusted, the more heat is released. Desorption is mostly a surface phenomenon. Increasing the bulk gas temperature does not result in as much $SO_2$ desorption as that which can be obtained at lower bulk gas temperatures with hydrocarbon present. This indicates that the surface temperature of the trap is more critical to the regeneration process than the bulk gas temperature. This is a desirable feature of the catalyzed traps of the present invention because it means that it is not necessary to significantly change the temperature of the bulk gas to regenerate the sorbent material.

EXAMPLE 2

$Pt/MnO_2$ Trap Material 120 g of bulk manganese oxide ($MnO_2$) was ballmilled with 150 g of water and 15.31 g of a 16.01% Pt solution of a soluble platinum salt and 6 ml of acetic acid. The resulting slurry was used to coat a 0.75 inch×1.0 inch substrate such as carrier 10 of FIG. 1 having 400 gas-flow passages (16 in FIG. 1) or cells per square inch of end face area (400 cpsi). The carrier had 2.0 g/in³ of washcoat after calcination at 550° C. for 2 hours.

Aging

This material was aged under conditions identical to those described in Example 1 for the $Pt/CeO_2$ trap.

Testing

This material was tested under conditions very similar to those used in the testing of the $Pt/CeO_2$ trap of Example 1. After aging, the sample was purged at a space velocity of 25,000/h, 500° C. inlet temperature, in a stream of 10% $O_2$ and 10% $H_2O$ in nitrogen for about 15 minutes. No significant $SO_2$ (i.e., less than 10 ppm) was desorbed during this process.

Figure 6:
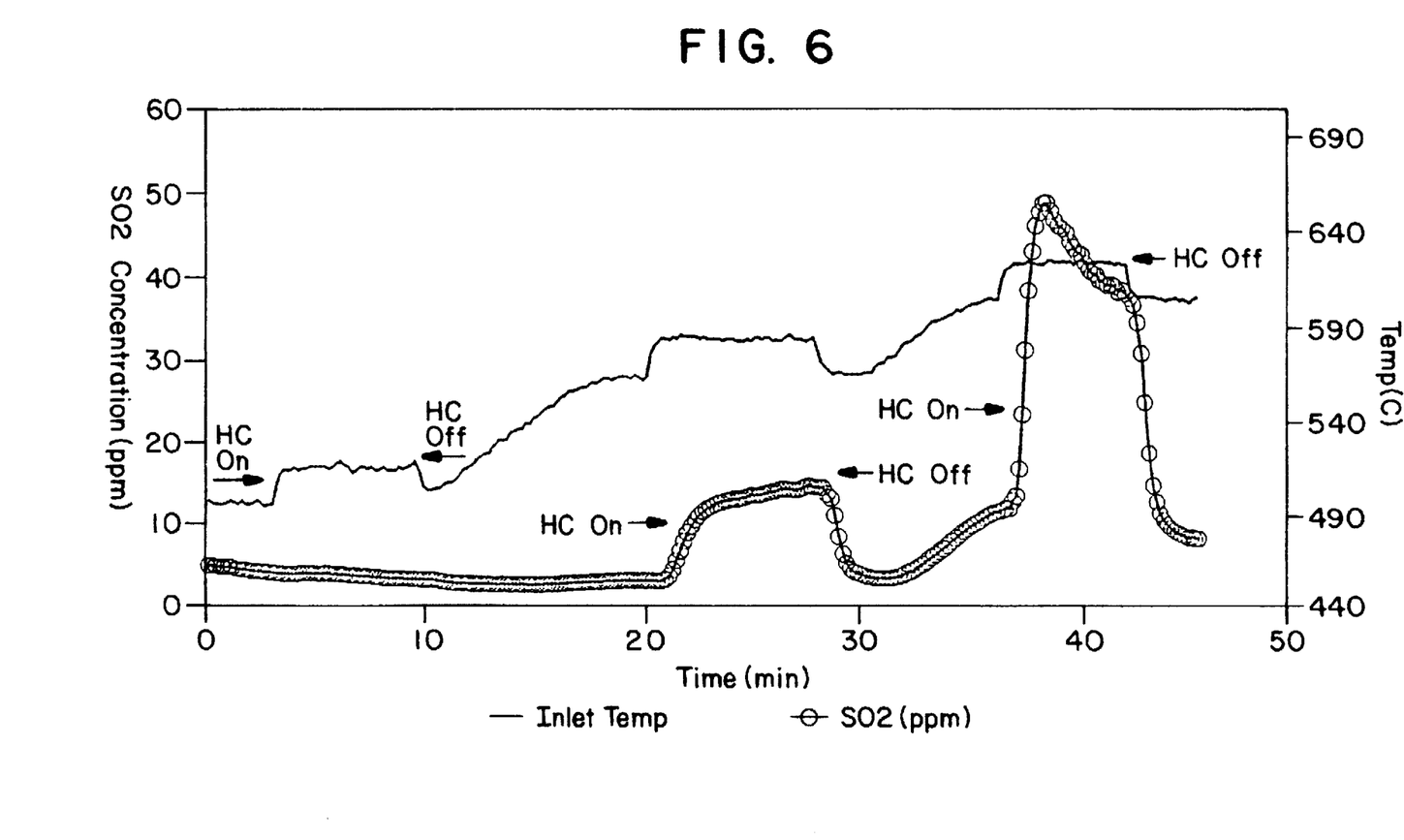
FIG. 6 depicts $SO_2$ desorption using propylene at various concentrations and various inlet temperatures.

The sample was then tested at a space velocity of 25,000/h in a flow of 10% $O_2$, 10% $H_2O$ in nitrogen, and 0–8000 ppm $C_1$ using propylene ($C_3H_6$) at a variety of inlet temperatures. The results of this test are shown in FIG. 6 and summarized in TABLE II below, wherein HC (vppm), $SO_2$ (vppm) and temperatures are as in TABLE I.

TABLE II

| TOS (min) | HC (ppm) | Inlet Temp | SO2 (ppm) |
|---|---|---|---|
| 0–3 | 0 | 565 | <5 |
| 3–10 | 8000 | 520 | <5 |
| 10–20 | 0 | 500–>560 | <5 |
| 20–28 | 8000 | 585 | 10–12 |
| 28–36 | 0 | 560–>600 | 10 @ 600° C. |
| 36–42 | 8000 | 625 | 50 to 40 |
| 42–46 | 0 | 600 | <10 |

As was observed in Example 1, hydrocarbon introduction into the feed induced $SO_2$ desorption from this $Pt/MnO_2$ trap material.

The data of the example show that a combustible component (hydrocarbon) can be used to generate local hot spots in the surface of the catalyzed trap material thus providing a mechanism for $SO_2$ desorption and trap regeneration.

EXAMPLE 3

Preparation of Platinum/$Al_2O_3$ Catalyst

A. 150 grams of gamma-alumina powder having a BET surface area of 150 m²/g (SBA-150) and 400 grams of water were ballmilled for 1 hour. To this slurry, 16.84 grams of a chloride-free platinum solution (18.24 weight percent platinum) was added followed by 7.5 ml of acetic acid. The resulting slurry was ballmilled at 36% solids to give a particle size of 90% of the particles having a diameter less than 9.3 microns.

B. Cylindrical, 400 cells per square inch ("cpsi") cordierite honeycomb-type members (such as member 10 of FIG. 1) measuring 1.91 cm in diameter and 2.54 cm in length (0.75 inches by 1.0 inches) were dipped into the slurry obtained in Part A followed by drying and calcination at 550° C. for 2 hours to give a washcoat loading of 2.1 g/in³. Platinum loading was 73.5 g/ft³. The resulting samples were designated E1. ("Washcoat" is the dried coating, including the platinum loading.)

C. Samples E1 were further coated with a discrete particulate layer of SrO plus $Al_2O_3$ and calcined again at 550° C. for 2 hours to give a second topcoat washcoat superposed over the first washcoat. The topcoat washcoat was prepared as follows. A slurry of SrO plus $Al_2O_3$ was prepared as follows. 150 g of strontium oxide and 50 g of alumina powder (SBA-150) were mixed together. To this mixture 400 g of water (chilled in an ice bath) was added slowly with stirring controlling the exotherm in the slip to less than 40° C. The mixture was allowed to stir in the ice bath for about 2 hours. Then 30 ml of acetic acid was added to the slip with stirring followed by 31 g of a binder (Nyacol 20: 20% $Al_2O_3$ by weight). The resulting slip was ballmilled overnight to a particle size of 90% of the particles having a diameter less than 9 microns and then applied as a topcoat to the E1 samples obtained in part A of this Example. The topcoat loading was 0.9 g/in³ and the resulting samples, in which the Pt oxidation catalyst was in segregated combination with the sorbent material, were designated E2.

The tests carried out on sample E2 were all conducted with lean gas mixtures.

The $NO_x$ adsorption performance of a fresh piece of sample E2 was compared to an aged sample of E2. The first E2 sample was aged as follows (SV is space velocity, at standard conditions of temperature and pressure):

SV: 25,000/hour

Inlet Temp: 650° C.

Time: 17 hours

O2: 7%

H2O: 10%

SO2: 50 ppm

The second E2 sample was aged under identical conditions except that 8000 ppm $C_1$ (using propylene) was periodically added to the feed 0–60 seconds HC-on followed by 60–120 seconds TOS in a cyclic fashion, throughout the aging procedure.

All three samples were tested for $NO_x$ adsorption at 300° C. inlet and 25,000/hour using 7% $O_2$, 250 ppm NO, and 10% $H_2O$. Although the first aged E2 sample was less active for $NO_x$ adsorption than the fresh sample, the second aged E2 sample (aged with the periodic HC addition) was slightly more active for $NO_x$ adsorption than the one aged without HC addition. Therefore, the periodic addition of HC during the aging procedure kept the material somewhat clean of sulfur oxides, thus providing evidence that it is possible to produce a hot spot on the surface of the trap to promote $SO_x$ desorption through the addition of combustible components such as HC's.

Figure 7:
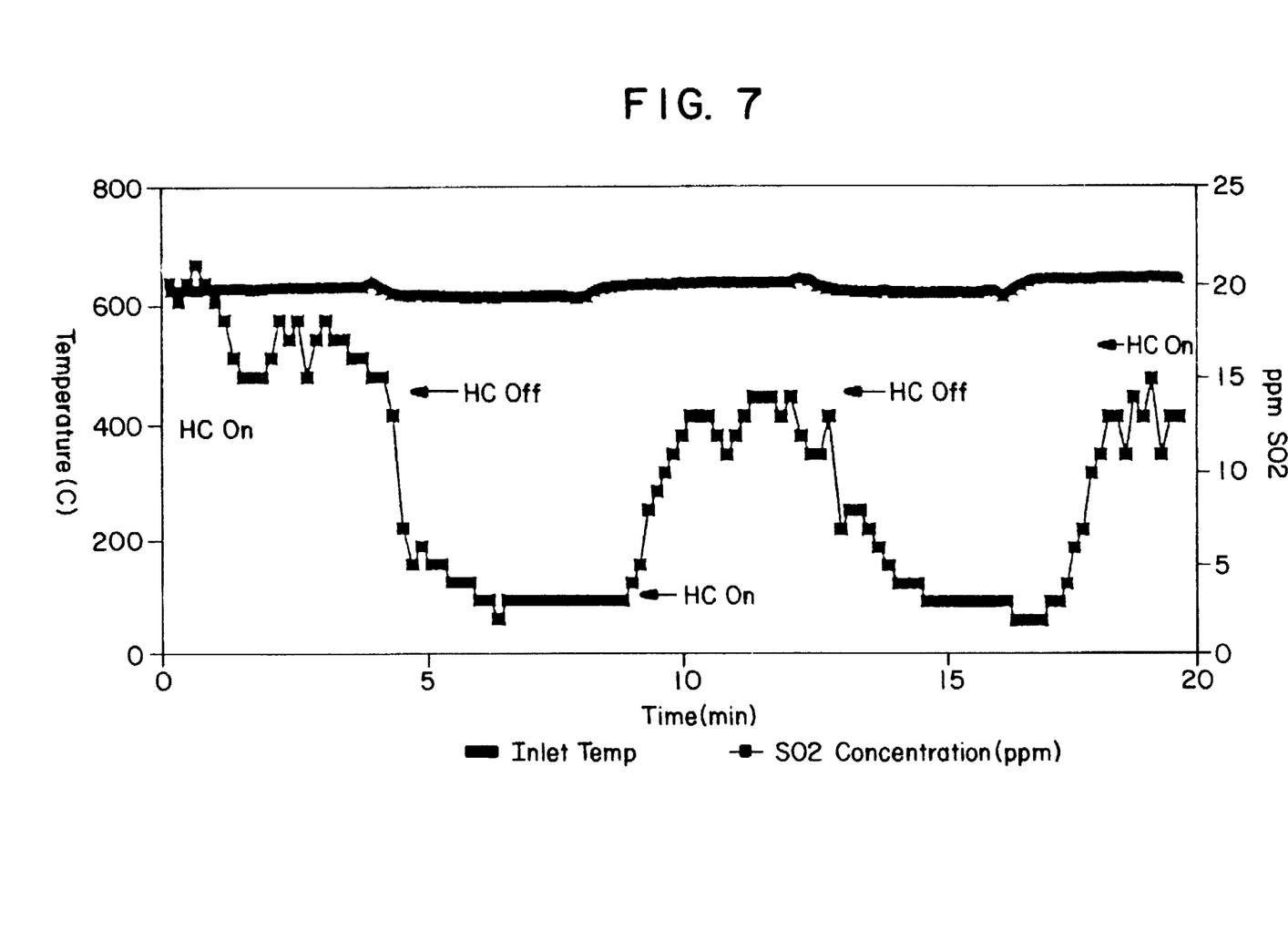
FIG. 7 depicts $SO_2$ desorption using sulfur-aged catalysts.

The second aged E2 sample (the one aged with $C_1$ additions) was further investigated after the $NO_x$ adsorption study by heating to 625°–650° C. and exposing the material to a feed of 7% $O_2$, 10% $H_2O$ and 0–8000 ppm $C_1$ (using propylene in nitrogen) at 25,000/hour. The results of this study are shown in FIG. 7 where it is clear that each time HC was added to the feed, an enhancement in $SO_x$ desorption from the sulfur-aged E2 sample was observed. This provides strong evidence that the trap can be regenerated by the addition of a combustible species to raise the temperature in the trap's washcoat, thus promoting $SO_x$ desorption.

While the invention has been described in detail with respect to specific embodiments thereof, it will be appreciated that numerous variations to the specific embodiments may well occur to those skilled in the art upon a reading and understanding of the foregoing and it is intended to embrace such variations within the scope of the appended claims.

What is claimed is:

1. A method for removing pollutants comprising nitrogen oxides and sorbable components comprising sulfur oxides and phosphorus oxides from a lean gaseous stream containing the same, the method comprising:

(a) in a trapping period, passing the gaseous stream within a sorbing temperature range through a catalyzed trap member comprising a combination of a regenerable sorbent material and an oxidation catalyst, and sorbing at least some of said sorbable components into the sorbent material to thereby provide a sorbable component-depleted gaseous stream exiting the catalyzed trap member;

(b) in a desorbing period, introducing a combustible component into the gaseous stream upstream of the catalyzed trap member and combusting the combustible component in the presence of the oxidation catalyst, the combustible component being introduced in an amount which is limited in order to maintain the bulk composition of the gaseous stream lean but which is enough to heat at least a portion of the sorbent material to within a desorbing temperature range to thereby thermally desorb the sorbable component from the sorbent material and provide a sorbable component-enriched gaseous stream exiting the catalyzed trap member; and (c) passing the sorbable component-depleted stream to a catalytic treatment zone for the abatement of said pollutants and by-passing the sorbable component-enriched stream around said catalytic treatment zone.

2. The method of claim 1 including controlling combustion during the desorbing period to maintain at least portions of the surface of the catalyzed trap member at a temperature above the bulk temperature of the sorbable component-enriched gaseous stream.

3. The method of claim 2, wherein the sorbable component comprises SOx.

4. The method of claim 1 wherein the catalytic treatment zone of step (c) comprises a NOx abatement catalyst having an effective operating temperature range below the desorbing temperature range of the SOx, and passing the SOx-depleted stream to the catalytic NOx abatement zone.

5. The method of claim 1 or claim 2 wherein the sorbable component is selected from the group consisting of one or both of $SO_x$ and $PO_x$.

6. The method of claim 1 or claim 2 wherein the sorbent material comprises at least one basic oxygenated compound and the oxidation catalyst comprises a catalyst selected from the group consisting of at least one platinum group metal catalytic component.

7. The method of claim 6 wherein the oxidation catalyst comprises a platinum catalytic component.

8. The method of claim 7 wherein the sorbent material is selected from the group consisting of one or more of metal oxides, metal carbonates, metal hydroxides and mixed metal oxides.

9. The method of claim 8 wherein the metals of the metal oxides, metal hydroxides and metal carbonates and at least one of the metals of the mixed metal oxides are selected from the group consisting of one or more of magnesium, calcium, strontium, barium and lanthanum.

10. The method of claim 8 wherein the sorbent material is selected from the group consisting of one or more oxides of cerium, praseodymium and elements of atomic numbers 22 through 29 inclusive.

11. The method of claim 8 wherein the sorbent material is selected from the group consisting of at least one compound selected from each of group A and group B wherein: group A consists of one or more of metal oxides, metal carbonates, metal hydroxides and mixed metal oxides, the metals of which (at least one metal of the mixed metal oxides) are selected from the group consisting of magnesium, calcium, strontium, barium and lanthanum; and group B consists of one or more oxides of cerium, praseodymium and elements of atomic numbers from 22 to 29 inclusive.

12. The method of claim 1 wherein the catalyzed trap member comprises a segregated combination of the oxidation catalyst and the sorbent.

* * * * *